United States Patent Office 3,260,770 Patented July 12, 1966

3,260,770

PROCESS FOR THE PRODUCTION OF METHYLPENTENES

James Keith Hambling, Sunbury-on-Thames, England, assignor to The British Petroleum Company Limited, London, England, a British joint-stock corporation No Drawing. Filed July 3, 1962, Ser. No. 207,385
Claims priority, application Great Britain, Aug. 4, 1961, 28,349/61
8 Claims. (Cl. 260—683.15)

This invention relates to a process for the production of hydrocarbons. More particularly this invention relates to a continuous process for the production of methylpentenes from propylene.

It has been proposed to produce methylpentenes from propylene by passing propylene over a dimerisation catalyst and thereafter isomerising the dimerisation product. Various catalysts have been suggested for use in the dimerisation step and the isomerisation step. Thus for use as dimerisation catalysts there has been proposed for example, aluminum alkyls such as aluminum tri-isobutyl, nickel oxide on silica-alumina, lamellar complexes of alkali metals and carbon, and sodium or lithium metal dispersed on anhydrous potassium compounds. For use as isomerisation catalysts there has been proposed for example, alumina, silica alumina, acid catalysts such as acidified alumina, phosphoric acid, alkylsulphonic acids and alkali metals deposited on alumina. Various combinations of these catalysts have been proposed. With all the above catalysts deactivation occurs after they have been in use for some time, and in order to operate the overall process economically regeneration of the catalysts is necessary periodically. Different catalysts will have active lifetimes of varying length and it may be necessary to shut down the process at different times in order to regenerate either the dimerisation catalyst or the isomerisation catalyst, and this will often be inconvenient. It has now been found that using the particular combination of sodium dispersed on potassium carbonate as dimerisation catalyst and potasium deposited on alumina as isomerisation catalyst, the production of methylpentenes may be periodically halted and both catalysts regenerated in a simple, expedient manner which enables the time during which the process is off-stream to be minimised.

According to the present invention there is provided a process which comprises continuously passing propylene over a dimerisation catalyst comprising sodium deposited on potassium carbonate, whereby at least one methylpentene is formed, and continuously passing the dimerisation product, or a fraction thereof comprising a methylpentene, over an isomerisation catalyst comprising potassium deposited on alumina, whereby isomerisation of a methylpentene takes place; periodically discontinuing the flow of propylene over the dimerisation catalyst and of methylpentene over the isomerisation catalyst and regenerating the catalyst by passing hydrogen at elevated temperature over one catalyst and passing the off-take hydrogen stream obtained therefrom at elevated temperature over the other catalyst, and thereafter restoring the flow of propylene over the dimerisation catalyst and of methylpentene over the isomerisation catalyst.

In accordance with one aspect of the invention hydrogen is passed over the dimerisation catalyst and the off-take hydrogen stream obtained therefrom is passed over the isomerisation catalyst.

In accordance with another aspect of the invention hydrogen is passed over the isomerisation catalyst and the off-take hydrogen stream obtained therefrom is passed over the dimerisation catalyst.

Preferably the temperature of the regeneration treatment of both catalysts lies in the range 50 to 400° C., preferably about 200° C. The treatment will usually be carried out at superatmospheric pressure, suitably in the range 5 to 500 lbs./sq. in. gauge, preferably about 300 lbs./sq. in. gauge.

The production and use of a sodium-on-potassium carbonate catalyst is described in British patent specification No. 933,253. Preferably this catalyst is made by mixing 1–20% by wt. of elemental sodium with anhydrous potassium carbonate. Preferably there is used 4–6% by wt. of elemental sodium based on the amount of potassium carbonate. The dimerisation of propylene on this catalyst is preferably effected using a temperature of 100–200° C., and preferably about 160° C., and using a pressure of 500–3000 lbs./sq. in. gauge, preferably 1500–2500 lbs./sq. in. gauge. The product contains a major proportion of 4-methylpentene-1 and a minor proportion of 4-methylpentene-2 together with some 2-methylpentene-1 and some 2-methylpentene-2. Preferably the propylene is substantially free of acetylenes.

The product obtained by the dimerisation of propylene may be fed in its entirety to the isomerisation stage. Usually, however, unreacted propylene will first be removed from the dimerisation product. If desired, the dimerisation product may be distilled to separate a $C_6$ fraction from higher boilers. High precision distillation is, in general, not necessary owing to the substantial interval between the $C_6$ fraction and the next boiling products. Preferably a column of at least 5 theoretical plates will be employed.

If desired, the dimerisation product may be distilled for the separation of 2-methylpentene-2, which is recovered, and a fraction comprising 4-methylpentene-1, 4-methylpentene-2 and 2-methylpentene-1 which is fed to the isomerisation stage. If desired 3-methylpentene-2 may be recovered with 2-methylpentene-2. Suitably the isomerisation product is blended with the dimerisation product to constitute the feed to this distillation stage. Usually there will be required for this distillation, in which 2-methylpentene-2 is recovered, a column of at least 60 theoretical plates, suitably having 100 theoretical plates.

If desired a separate distillation stage may be provided after the isomerisation stage for the recovery of 2-methylpentene-2 or a concentrate thereof.

The isomerisation catalyst may be formed by dispersing potassium on alumina at elevated temperature, preferably in the range 80–150° C. Preferably the catalyst contains 2–30%, preferably 5–15%, by weight of potassium, based on the weight of the alumina. Preferably the alumina is activated before use, at a temperature above 80° C. for example, at about 400° C. Suitably isomerisation is carried out at ambient temperature and atmospheric pressure.

For the regeneration treatment there may be used hydrogen alone or mixtures which include hydrogen.

If desired hydrogenation may be carried out using a gas consisting of hydrogen together with inert constituents. Preferably, when inert constituents are present, the gas contains at least 25 mol percent of hydrogen, the proportion suitably lying within the range 25–90 mol percent of hydrogen.

A preferred gas is a platformer tail gas. Suitably a gas is employed containing 70 mol percent of hydrogen. A typical gas will consist of 70 mol percent of hydrogen and 30 mol percent of methane. Other suitable gases are steam cracker tail gas, catalytic cracker tail gas derived from the dehydrogenation of hydrocarbons. The hydrogen-containing gas should be free of acetylenes.

The invention is illustrated but not limited by reference to the following example.

A sodium on potassium carbonate catalyst was prepared by dispersing 13 grams of sodium at 360° C. on 257 grams of anhydrous potassium carbonate. Propylene was continuously passed at a rate of 200 mls. (liquid) per hour over this catalyst at 160° C. and 1500 lbs./sq. in. gauge. Analysis of the product showed that conversion was 70% by wt. of feed per pass. The hexenes produced contained 84.2% by weight of 4-methylpentene-1, 6.4% by weight of 4-methylpentene-2, 7.9% by weight of 2-methylpentene-1 and 1% by weight of 2-methylpentene-2.

The total reaction product, including unreacted propylene, was passed to an isomerisation stage in which it was percolated through a bed of potassium-on-alumina obtained by dispersing 70 grams of potassium at 150° C. on 630 grams of alumina at ambient conditions of temperature and pressure.

The isomerisation reaction product, on analysis, was found to contain 76% by weight of 2-methylpentene-2, 10% by weight 4-methylpentene-2, 11% by weight of 2-methylpentene-1 and 0.5% by weight 4-methylpentene-1.

After the reaction had been in progress for 350 hours the 2-methylpentene-2 content of the hexene isomerisation product has dropped to 54% by weight indicating a loss of activity of the isomerisation catalyst. On inspection it was found that the activity of the dimerisation catalyst had also diminished to a conversion of 60% by weight of feed per pass.

The supply of propylene feed was stopped and both the dimerisation stage and isomerisation stage were purged of product. The isomerisation catalyst was treated with hydrogen at 200° C. and 300 lbs./sq. in. gauge for 3 hours, the off-take hydrogen being fed to the dimerisation catalyst at 200° C. and 300 lbs./sq. in. gauge for the same period.

After the 3 hours, the two stages were purged of hydrogen and the conversion reaction was started up under the same conditions of temperature and pressure as stated above.

On inspection of the hexenes from the dimerisation stage it was found that the conversion had been restored to 70% with substantially identical percentage composition of the methylpentenes, and the amount of 2-methylpentene-2 in the isomerisation product was restored to 76% by weight.

After a further 350 hours on stream, the above procedure was repeated with substantially identical results.

I claim:

1. A process for the production of methylpentenes from propylene comprising: continuously passing propylene over a dimerisation catalyst comprising sodium dispersed on potassium carbonate to obtain a dimerisation product predominating in 4-methylpentene-1, continuously passing the dimerisation product over an isomerisation catalyst comprising potassium deposited on alumina whereby isomerisation of said methylpentene takes place; periodically discontinuing the flow of propylene over the dimerisation catalyst and regenerating the said catalysts by passing hydrogen at elevated temperature over the catalyst and passing the off-take hydrogen stream obtained therefrom at elevated temperature over the other catalyst and thereafter restoring the flow of propylene over the dimerisation catalyst and of said dimerisation product over the isomerisation catalyst.

2. A process according to claim 1 comprising: passing hydrogen over the dimerisation catalyst and passing the off-take hydrogen stream obtained therefrom over the isomerisation catalyst.

3. A process according to claim 1 comprising: passing hydrogen over the isomerisation catalyst and passing the off-take hydrogen stream obtained therefrom over the dimerisation catalyst.

4. A process according to claim 1 comprising: regenerating the catalysts at a temperature in the range 50° to 400° C. and a pressure in the range 5 to 500 lbs./sq. in. gauge.

5. A process according to claim 1 comprising: dimerising the propylene at a temperature in the range 100–200° C. and a pressure of 500–3000 lbs./sq. in. gauge.

6. A process according to claim 1 wherein the isomerisation reaction is carried out at ambient temperature and atmospheric pressure.

7. A process according to claim 1 wherein the regeneration is effected using a gas containing hydrogen together with inert constituents.

8. A process according to claim 7 wherein said gas contains at least 25 mol percent of hydrogen.

References Cited by the Examiner

UNITED STATES PATENTS

| | | | |
|---|---|---|---|
| 2,881,234 | 4/1959 | Esmay et al. | 260—683.15 |
| 2,952,719 | 9/1960 | Appell | 260—683.15 |
| 2,986,588 | 5/1961 | Schramm | 260—683.15 |

FOREIGN PATENTS

| | | |
|---|---|---|
| 1,227,240 | 8/1960 | France. |

PAUL M. COUGHLAN, Jr., *Primary Examiner.*
ALPHONSO D. SULLIVAN, *Examiner.*